(12) United States Patent
Endo et al.

(10) Patent No.: US 11,934,011 B2
(45) Date of Patent: Mar. 19, 2024

(54) OPTICAL CONNECTING STRUCTURE

(71) Applicant: Nippon Telegraph and Telephone Corporation, Tokyo (JP)

(72) Inventors: Jun Endo, Tokyo (JP); Kota Shikama, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 309 days.

(21) Appl. No.: 17/432,266

(22) PCT Filed: Apr. 2, 2020

(86) PCT No.: PCT/JP2020/015158
§ 371 (c)(1),
(2) Date: Aug. 19, 2021

(87) PCT Pub. No.: WO2020/213410
PCT Pub. Date: Oct. 22, 2020

(65) Prior Publication Data
US 2022/0057580 A1 Feb. 24, 2022

(30) Foreign Application Priority Data
Apr. 15, 2019 (JP) .................................. 2019-076828

(51) Int. Cl.
*G02B 6/30* (2006.01)
*B29D 11/00* (2006.01)
(Continued)

(52) U.S. Cl.
CPC .......... *G02B 6/30* (2013.01); *B29D 11/00692* (2013.01); *G02B 6/32* (2013.01); *G02B 2006/12102* (2013.01)

(58) Field of Classification Search
CPC .... G02B 6/30; G02B 6/305; G02B 6/32–327; G02B 2006/12102
See application file for complete search history.

(56) References Cited

U.S. PATENT DOCUMENTS 4,278,322 A * 7/1981 Mahlein ............... G02B 6/4206
385/33
5,392,372 A * 2/1995 Kurata ................. G02B 6/4212
385/52
(Continued)

FOREIGN PATENT DOCUMENTS

JP H05196825 A 8/1993
JP 7-9496 B2 * 2/1995
(Continued)

OTHER PUBLICATIONS

English translation of written opinion for PCT/JP2020/015158, dated Apr. 15, 2019. (Year: 2019).*
(Continued)

*Primary Examiner* — Michael Stahl
(74) *Attorney, Agent, or Firm* — Slater Matsil, LLP

(57) ABSTRACT

An optical connection structure 1 includes a waveguide substrate; a Si waveguide formed on one surface of the waveguide substrate and having a first end surface; an optical fiber having a second end surface facing the first end surface; a terrace section extending further toward the optical fiber side from an end portion on the optical fiber side of the waveguide substrate; and a lens disposed on the terrace section, and arranged on an optical axis connecting the first end surface and the second end surface.

18 Claims, 3 Drawing Sheets

(51) Int. Cl.
*G02B 6/32* (2006.01)
*G02B 6/12* (2006.01)

(56) References Cited

U.S. PATENT DOCUMENTS

| | | | | |
|---|---|---|---|---|
| 6,181,855 | B1* | 1/2001 | Richter | G02B 6/255 |
| | | | | 385/52 |
| 10,234,626 | B2* | 3/2019 | Lambert | H01S 5/4025 |
| 2002/0196998 | A1* | 12/2002 | Steinberg | G02B 6/322 |
| | | | | 385/39 |
| 2002/0197010 | A1* | 12/2002 | Kato | C07K 14/37 |
| | | | | 385/74 |
| 2003/0123805 | A1 | 7/2003 | Akashi et al. | |
| 2003/0227100 | A1* | 12/2003 | Chandross | G02B 3/14 |
| | | | | 264/1.36 |
| 2008/0131052 | A1* | 6/2008 | Matsumura | G02B 3/0087 |
| | | | | 385/33 |
| 2013/0188910 | A1 | 7/2013 | Tokushima et al. | |
| 2016/0349455 | A1* | 12/2016 | Amb | G02B 1/045 |
| 2022/0057578 | A1* | 2/2022 | Endo | G02B 6/26 |
| 2022/0229240 | A1* | 7/2022 | Shikama | G02B 6/262 |

FOREIGN PATENT DOCUMENTS

| | | |
|---|---|---|
| JP | H0868927 A | 3/1996 |
| JP | 2003255194 A | 9/2003 |
| JP | 2003270482 A | 9/2003 |
| JP | 2010278201 A | 12/2010 |
| JP | 2012083446 A | 4/2012 |

OTHER PUBLICATIONS

C. Yang et al. Fabrication of a polymeric vertical microlens with the dip method. Applied Optics, 45:32:8273-8277, Nov. 10, 2006 (https://doi.org/10.1364/AO.45.008273). (Year: 2006).*

* cited by examiner

US 11,934,011 B2

OPTICAL CONNECTING STRUCTURE

CROSS-REFERENCE TO RELATED APPLICATIONS

This application is a national phase entry of PCT Application No. PCT/JP2020/015158, filed on Apr. 2, 2020, which claims priority to Japanese Application No. 2019-076828, filed on Apr. 15, 2019, which applications are hereby incorporated herein by reference.

TECHNICAL FIELD

The present invention relates to an optical connection structure, and particularly relates to a mode field conversion technique in which a mode field diameter of input light is converted and output.

BACKGROUND

A technology called silicon photonics has attracted attention as a technology in which optoelectronic devices are collectively integrated on the same substrate. In silicon photonics, a core formed of silicon (Si) and a clad formed of quartz ($SiO_2$) constitute a waveguide (referred to as a Si waveguide). In order to transmit waveguide light in the Si waveguide with high coupling efficiency through an optical fiber, an optical connection structure configured to match a mode field of the Si waveguide with a mode field of the optical fiber is required.

A conventional optical connection structure configured to couple optical waveguides having different mode fields is exemplified below. For example, in an optical connection structure 300 illustrated in FIG. 3, a cross-sectional area of a core 311 of a waveguide 310 is monotonously decreased toward a light propagation direction (z axis) side to form a reverse tapered structure, and the waveguide 310 and an optical fiber 320 are optically coupled through an adhesive layer 330 (see Patent Literature (PTL) 1).

In the conventional optical connection structure 300 described in PTL 1, a core 312 is formed around the core 311 having the reverse tapered structure, and the core 312 is filled with a field, thereby converting a mode field diameter. In general, a plurality of higher order modes are present in a mixed manner after the conversion. In addition, a radiation mode contained in outgoing light from an end surface of the waveguide 310 is reduced by the expansion of the mode field, but is not completely suppressed.

On the other hand, a lens optical system in which outgoing light from a waveguide is focused by a lens and coupled to a fiber is able to cause the light including a radiation mode to enter into a fiber core and is also able to propagate the light in the fundamental mode. In general, the lens coupling system configured to completely suppress a radiation mode and high order modes tends to increase a lens height, an optical path length, and the overall size of the optical connection structure (see PTL 2). As such, a method for achieving high coupling efficiency and size reduction is proposed by using a minute lens with an outer diameter of several hundred micrometers or less (see PTL 3).

As an aspect of an optical connection structure in which a minute lens is formed, a structure in which a minute lens is mounted in a guide groove obtained by performing anisotropic etching on a Si substrate (see PTL 4) and a structure in which a minute lens is inserted in an adhesive region between waveguides (see PTL 3) are proposed.

CITATION LIST

Patent Literature

PTL 1: JP 2012-83446 A
PTL 2: JP 2010-278201 A
PTL 3: JP 2003-270482 A
PTL 4: JP 2003-255194 A.

SUMMARY

Technical Problem

However, in the substrate being processed by anisotropic etching to obtain a guide groove for mounting a minute lens thereupon, there is a possibility of damaging a waveguide. In a case where a groove is formed on the substrate by another processing in order to prevent the damage from occurring, there arises a problem in that the number of pieces of processing is increased and thus reduction in productivity occurs. Because of this, it is difficult to accurately constitute an optical system having a focusing function for coupling waveguides with high efficiency, and to provide an optical connection structure with high productivity.

Embodiments of the present invention has been conceived to solve the problems described above, and an object thereof is to provide an optical connection structure able to couple waveguides with high efficiency and to achieve high productivity.

Means for Solving the Problem

In order to solve the problems described above, an optical connection structure according to embodiments of the present invention includes a substrate; a first waveguide that is formed on one surface of the substrate and includes a first end surface; a second waveguide that includes a second end surface facing the first end surface; a terrace that extends further toward the second waveguide side from an end portion on the second waveguide side of the substrate; and an optical element that is disposed on the terrace, and is arranged on an optical axis connecting the first end surface and the second end surface.

The optical connection structure according to embodiments of the present invention may further include a connection layer that is formed of a material having a refractive index smaller than a refractive index of the optical element, and is configured to cover the optical element between the first end surface and the second end surface.

In the optical connection structure according to embodiments of the present invention, a length along the optical axis of the terrace may be a length corresponding to an optical path length of an optical system including the optical element formed in the connection layer.

The optical connection structure according to embodiments of the present invention may further include an adhesive layer configured to bond an end surface on the second waveguide side of the terrace to the second end surface.

In the optical connection structure according to embodiments of the present invention, a surface of the terrace may be lower in position than the one surface of the substrate on which the first waveguide is formed.

In the optical connection structure according to embodiments of the present invention, the optical element may include a light curing resin material.

In the optical connection structure according to embodiments of the present invention, the optical element may be a lens configured to focus light.

In the optical connection structure according to embodiments of the present invention, a plurality of the optical elements may be provided.

Effects of Embodiments of the Invention

According to embodiments of the present invention, it is possible to provide an optical connection structure able to couple waveguides with high efficiency and also able to achieve high productivity, because there is provided therein a terrace that extends further toward a second waveguide side from an end portion on the second waveguide side of a substrate, on one surface of which a first waveguide is formed, and an optical element is disposed on the terrace and is arranged on an optical axis.

DETAILED DESCRIPTION OF ILLUSTRATIVE EMBODIMENTS

Hereinafter, embodiments of the present invention will be described in detail with reference to FIGS. 1 and 2. Common constituent elements to each drawing are labeled with the same reference signs.

First Embodiment

Figure 1:
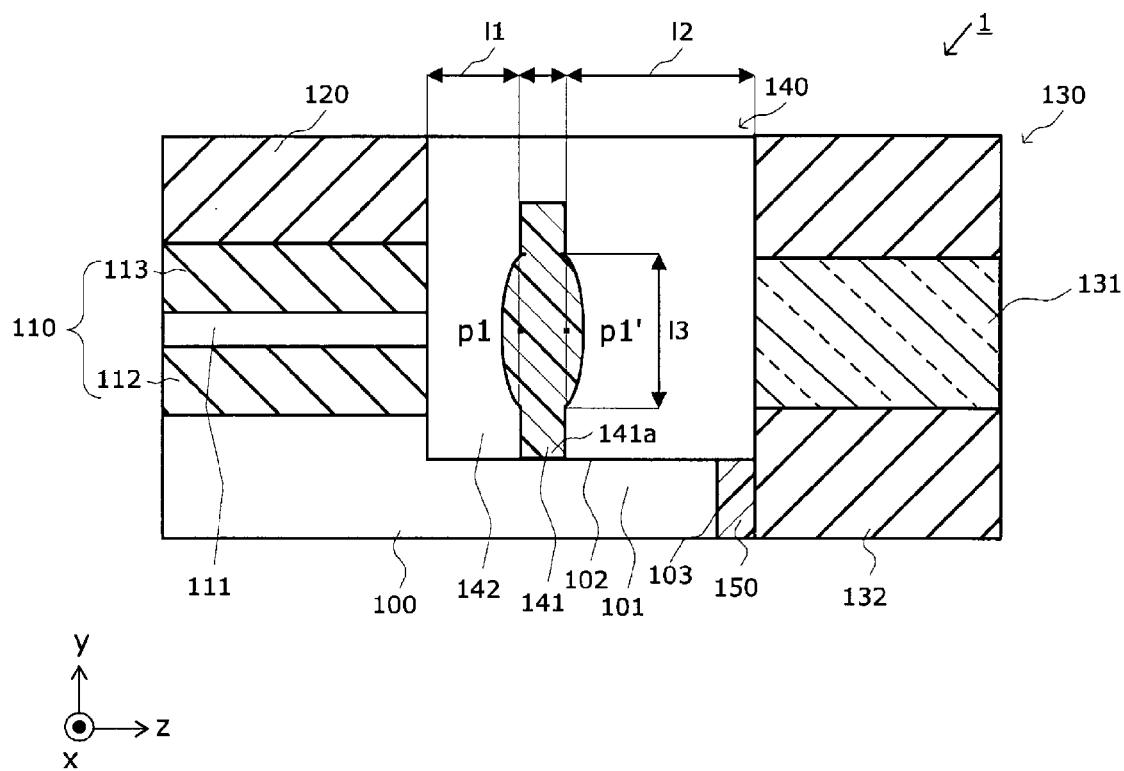
FIG. 1 is a schematic cross-sectional view of an optical connection structure according to a first embodiment of the present invention.

FIG. 1 is a schematic cross-sectional view of an optical connection structure 1 according to a first embodiment of the present invention. The optical connection structure 1 according to the present embodiment includes a waveguide substrate (substrate) 100 having a terrace section 101; a Si waveguide (first waveguide) 110; an optical fiber (second waveguide) 130; and a connection layer 140 including a lens (optical element) 141 disposed between an end surface (first end surface) of the Si waveguide 110 and an end surface (second end surface) of the optical fiber 130.

The optical connection structure 1 converts a mode field diameter of light input to the Si waveguide 110 and couples it to the optical fiber 130.

It is assumed in the description below that x, y, and z axes illustrated in each of the drawings including FIG. 1 are orthogonal to one another, and the vertical direction is set as the y axis, the horizontal direction is set as the x axis, and the propagation direction of light, that is, the direction along an optical axis is set as the z axis.

In addition, in the present embodiment, a case in which light is input from the Si waveguide 110 and propagates to the optical fiber 130 will be described.

First, an outline of the optical connection structure 1 according to the present embodiment is described below.

In the optical connection structure 1 according to the present embodiment, the terrace section (terrace) 101 extending toward the optical fiber 130 side relative to a position of an outgoing end surface of the Si waveguide 110, is formed at an end portion on the optical fiber 130 side of the waveguide substrate 100 the surface of which the Si waveguide 110 is formed on. The lens 141 is disposed on a surface 102 of the terrace section 101. In addition, the lens 141 is arranged on the optical axis (z axis).

An end surface 103 on the optical fiber 130 side of the terrace section 101 is formed to be a flat plane orthogonal to the optical axis of the light propagating through the Si waveguide 110, and is joined to the end surface of the optical fiber 130 with an adhesive layer 150 interposed therebetween. A space formed by the surface 102 of the terrace section 101, the outgoing end surface of the Si waveguide 110, and the end surface of the optical fiber 130 is filled with a filler 142 to cover the lens 141, thereby forming the connection layer 140. The connection layer 140 is provided between the outgoing end surface of the Si waveguide 110 and the end surface of the optical fiber 130 facing the outgoing end surface, and constitutes an optical system in the optical connection structure 1.

In this manner, the optical connection structure 1 according to the present embodiment focuses the outgoing light from the Si waveguide 110 by the lens 141 provided on the terrace section 101 and arranged on the optical axis, and couples the light to the optical fiber 130.

Each constituent element of the optical connection structure 1 according to the present embodiment will be described below.

The waveguide substrate 100 is formed in a plate shape. The waveguide substrate 100 is formed of a Si material. The Si waveguide 110 is formed on part of a surface (one surface) of the waveguide substrate 100. A rear surface of the waveguide substrate 100 is formed to be flat.

The terrace section 101 is formed at the end portion on the optical fiber 130 side of the waveguide substrate 100, and extends toward the optical fiber 130 side relative to the position of the end surface of the Si waveguide 110 in an optical axis direction connecting the end surface of the Si waveguide 110 and the end surface of the optical fiber 130. The surface 102 of the terrace section 101 is formed so that the position thereof is lower than that of a surface on which the Si waveguide 110 is formed. In other words, the thickness (y axis) of the terrace section 101 is thinner than the thickness of the waveguide substrate 100 in a region where the Si waveguide 110 is formed. The end surface 103 on the optical fiber 130 side of the terrace section 101 has a flat plane orthogonal to the optical axis, and connects to the optical fiber 130 with the adhesive layer 150 interposed therebetween.

The terrace section 101 has the surface 102 formed on a flat plane parallel to the optical axis (z axis) of the Si waveguide 110 and the x axis orthogonal to the optical axis (x-z plane), for example. The lens 141 is disposed on the surface 102 of the terrace section 101. The length in the optical axis direction of the terrace section 101 may be a length determined in accordance with the constitution of the optical system formed in the connection layer 140 including the lens 141 to be described below.

The terrace section 101 of the waveguide substrate 100 may be formed by a known semiconductor manufacturing process. In addition, the end surface on the optical fiber 130 side of each of the waveguide substrate 100, the Si waveguide 110, and a block 120 to be described below may be formed to be a flat plane orthogonal to the optical axis (z axis) by cutting work, for example, to form the terrace section 101. Furthermore, the surface 102 and the end surface 103 having been cut of the terrace section 101 may be polished.

The Si waveguide 110 includes a core 111, and a lower clad 112 and an upper clad 113 covering the core 111. The Si waveguide 110 is disposed in a region on the surface of the waveguide substrate 100 on the light incident side in the optical connection structure 1. In other words, the Si waveguide 110 is formed in a region on part of the surface of the waveguide substrate 100. As illustrated in FIG. 1, for example, the core in, the lower clad 112, and the upper clad 113 may be formed to have a set shape toward the optical fiber 130. The end surface on the light outgoing side of the Si waveguide 110 has a flat plane orthogonal to the optical axis.

The core in may be formed of Si as a material. The lower clad 112 and the upper clad 113 may be formed of $SiO_2$ as a material.

On a surface of the upper clad 113 of the Si waveguide 110, the block 120 is provided as a dummy block for adjusting the height of the optical connection structure 1. The length along the optical axis of the block 120 matches the length along the optical axis of the Si waveguide 110. In addition, the block 120 is formed to have a thickness (y axis) such that the height in the y axis direction of the waveguide substrate 100 and the waveguide including the Si waveguide 110 comes to have a desired height, for example, a height that matches the height in the y axis direction of the optical fiber 130. The block 120 is formed of a quartz-based material or a resin material. The thermal expansion coefficient of the block 120 may use a material having a thermal expansion coefficient value close to that of the upper clad 113 of the Si waveguide 110.

The optical fiber 130 includes a core 131 and a clad 132 being formed covering the core 131. A quartz-based material, for example, is used for the optical fiber 130, but the optical fiber 130 may be formed by other inorganic materials or organic materials (for example, polymers).

The core 131 is provided at the center of the optical fiber 130, and propagates the light, the mode field of which has been converted by the Si waveguide 110. Note that the core 131 is not limited to a case of having a circular cross section, and may have a rectangular shape like a planar light-wave circuit, for example. The clad 132 is formed to cover the outer circumferential surface of the core 131.

The connection layer 140 is formed between the end surface of the Si waveguide 110 and the end surface of the optical fiber 130 on the surface of the terrace section 101 formed at the end portion of the waveguide substrate 100. The connection layer 140 constitutes the optical system in the optical connection structure 1.

The lens 141 is disposed on the surface 102 of the terrace section 101 and is arranged on the optical axis. The lens 141 controls an optical path of a light field propagating through the Si waveguide 110. The light that propagates passing through an end portion of the core in of the Si waveguide 110 is focused by the lens 141 and coupled to the optical fiber 130.

The lens 141 has a biconvex spherical lens structure or an aspheric lens structure, for example. In addition, the lens 141 is supported by a supporter 141a erected on the surface 102 of the terrace section 101, for example. In the lens 141, a height l3 (hereinafter referred to as a lens height l3) of a portion that contributes to focusing the light may be, for example, approximately 100 μm. As illustrated in FIG. 1, principal points p1 and p1' of the lens 141 are arranged to coincide with the optical axis by adjusting the height of the supporter 141a.

As illustrated in FIG. 1, the optical path length of the optical system formed in the connection layer 140 is represented by the sum of an object distance l1, which is a distance from the outgoing end surface of the Si waveguide 110 to the principal point p1, an image distance l2, which is a distance from the principal point p1' on the optical fiber 130 side to an image, and a distance between the principal points p1 and p1' of the lens 141.

In the present embodiment, the distance from the outgoing end surface of the Si waveguide 110 to the end surface of the optical fiber 130 may be approximately equal to the above-described optical path length, which is, for example, several hundred micrometers. The length along the optical axis of the terrace section 101 may also have the same length. Thus, the lens 141 may be formed at an accurate position between the end surface of the Si waveguide 110 along the optical axis and the end surface of the optical fiber 130.

The lens 141 is formed of, for example, a light curing resin material. Specifically, a lens plane may be formed on a sheet-like plate. In this case, the supporter 141a includes a part of the sheet-like plate. The supporter 141a and the lens 141 may be integrally formed. The lens 141 may be integrally formed with the terrace section 101. The thermal expansion coefficient of the light curing resin used as a material of the lens 141 may use a material having a thermal expansion coefficient close to that of the waveguide substrate 100.

The connection layer 140 is filled with the filler 142 in such a manner as to cover the lens 141. The filler 142 has a refractive index smaller than that of the lens 141, and may use a resin material, for example. Air may be used as the filler 142. Alternatively, the filler 142 may employ a non-volatile gas. Even when a resin adhesive or the like is used as the filler 142, the end surface of the block 120 serves as a wall, so that the filler 142 is prevented from flowing out. By using the filler 142, the reflectance among the outgoing end surface of the Si waveguide 110, the minute lens 141, and the end surface of the optical fiber 130 may be reduced.

The connection layer 140 having the above-described constitution focuses outgoing light from the end surface of the core 111 of the Si waveguide 110 and converts the mode field of the light. The mode field of the light propagating through the Si waveguide 110 may be coupled to the eigenmode of the optical fiber 130 by the lens 141 with high efficiency.

The adhesive layer 150 bonds the end surface 103 of the terrace section 101, which is the end surface on the optical fiber 130 side of the waveguide substrate 100, and the end surface of the optical fiber 130. For example, an epoxy-based or acrylic-based material may be used for the adhesive layer 150.

As described above, according to the optical connection structure 1 according to the first embodiment, the terrace section 101 extending toward the optical fiber 130 side relative to the position of the outgoing end surface of the Si waveguide 110, is formed at the end portion on the optical fiber 130 side of the waveguide substrate 100. The lens 141 is disposed on the surface 102 of the terrace section 101 and is arranged on the optical axis. Because of this, the lens 141 may be arranged at an accurate position on the optical axis between the outgoing end surface of the Si waveguide 110 and the end surface of the optical fiber 130.

As a result, it is possible to constitute the minute lens 141 having a focusing function with high accuracy, and couple the waveguides for the Si waveguide 110 and the optical fiber 130 with high efficiency.

It is also possible to utilize a stepped surface of the waveguide substrate 100 formed in the manufacturing process of the Si waveguide 110 as the terrace section 101, and it is possible to form the lens 141 more simply and reliably. In addition, since the lens 141 can also be constituted by integral formation processing with the waveguide substrate 100, the optical connection structure 1 with higher productivity may be provided.

Second Embodiment

Next, a second embodiment of the present invention will be described. Note that in the description that follows, the same configurations as those in the above-described first embodiment are denoted by the same reference signs, and descriptions thereof will be omitted.

In the first embodiment, a case in which the single lens 141 is provided in the connection layer 140 has been described. In contrast, in the second embodiment, a plurality of lenses 141 and 143 are provided. A configuration different from that of the first embodiment will mainly be described below.

Figure 2:
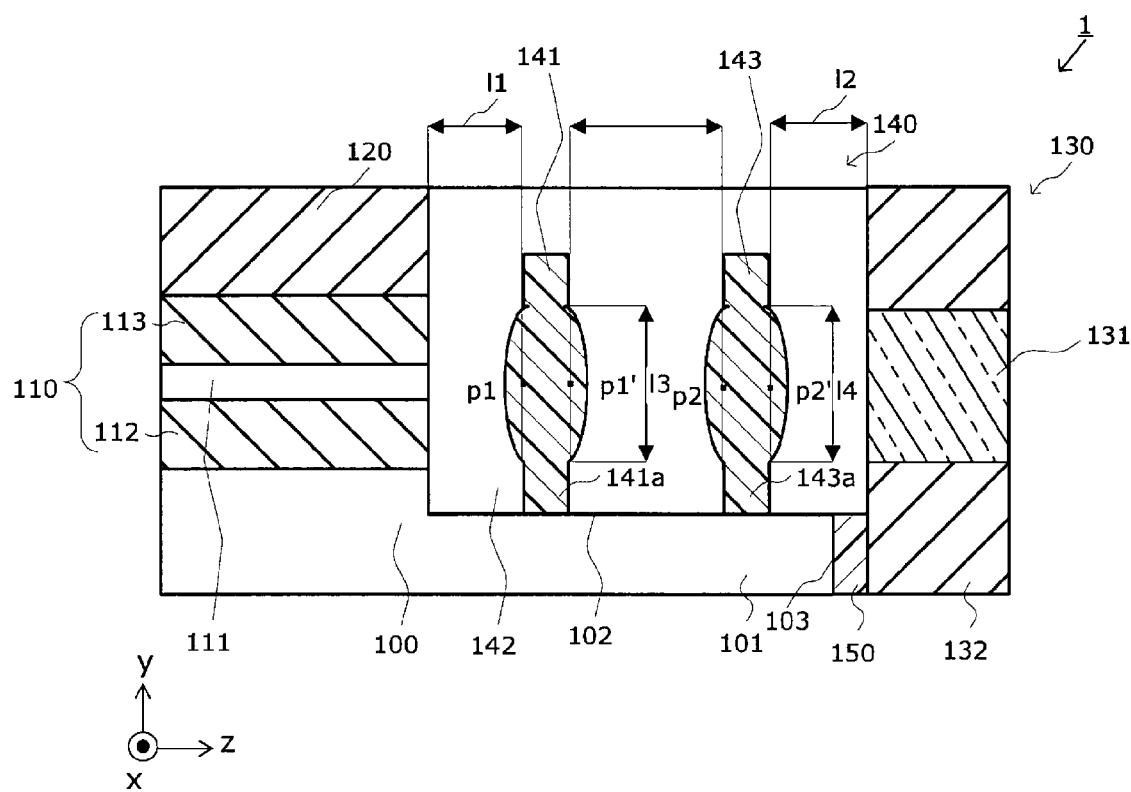
FIG. 2 is a schematic cross-sectional view of an optical connection structure according to a second embodiment of the present invention.
Figure 3:
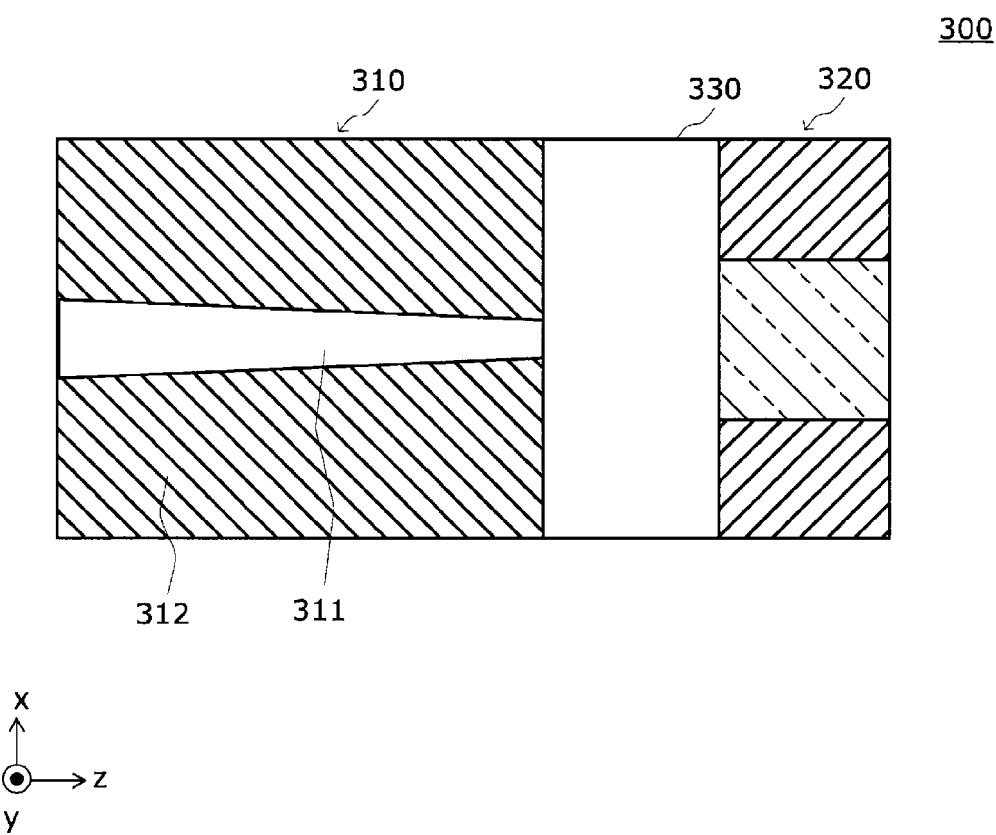
FIG. 3 is a schematic plan view of an optical connection structure according to an example of related art.

FIG. 2 is a schematic cross-sectional view of the optical connection structure 1 according to the second embodiment. The optical connection structure 1 according to the present embodiment, similarly to the first embodiment described above, includes the waveguide substrate 100 having the terrace section 101, the Si waveguide 110, the block 120, the optical fiber 130, the connection layer 140, and the adhesive layer 150.

The connection layer 140 is provided with the plurality of lenses 141 and 143.

The lenses 141 and 143 are disposed on the surface 102 of the terrace section 101 spaced apart from each other along the optical axis. The lenses 141 and 143 are supported by supporters 141a and 143a respectively, and are provided on the optical axis. A biconvex spherical lens or an aspheric lens may be used as the lenses 141 and 143.

Based on the constitution of an optical system formed in the connection layer 140 including the plurality of lenses 141 and 143, the distance between an end surface of the Si waveguide 110 and an end surface of the optical fiber 130 can be determined. More specifically, an optical path length of the optical system including the plurality of lenses 141 and 143 and the filler 142 is represented by the sum of the object distance l1, the image distance l2, and a distance between the principal point p1' of the lens 141 and the principal point p2 of the lens 143. The distance from the outgoing end surface of the Si waveguide 110 to the end surface of the optical fiber 130 may be a distance approximately equal to the optical path length of the optical system.

Here, as illustrated in FIG. 2, the object distance l1 is a distance between the principal point p1 on the Si waveguide 110 side of the lens 141 and the outgoing end surface of the Si waveguide 110. In addition, the image distance l2 is a distance between the principal point p2' on the optical fiber 130 side of the lens 143 and the end surface of the optical fiber 130. The distance from the outgoing end surface of the Si waveguide 110 to the end surface of the optical fiber 130 may employ a distance of several hundred micrometers, for example.

The distance along the optical axis of the terrace section 101 may also employ a distance similar to that from the outgoing end surface of the Si waveguide 110 to the end surface of the optical fiber 130.

It is also possible to use the lens 141 with a lens height l3 and the lens 143 with a lens height l4, where the lens height l3 and the lens height l4 are equal to each other and are approximately 100 μm, for example. The lenses 141 and 143 may be formed of, for example, a light curing resin material. In addition, the filler 142 of the connection layer 140 is formed of a resin material having a refractive index smaller than that of the lenses 141 and 143. Air may be used as the filler 142.

As described above, according to the optical connection structure 1 according to the second embodiment, since the plurality of lenses 141 and 143 are disposed on the surface 102 of the terrace section 101 to be arranged on the optical axis, the light focusing function is further enhanced and the waveguides for the Si waveguide 110 and the optical fiber 130 may be coupled to each other with higher efficiency.

Note that, although, in the above-described embodiment, a case in which two lenses 141 and 143 are used is exemplified and described, the number of lenses may be three or more.

Although the embodiment of the optical connection structure of the present invention has been described thus far, the present invention is not limited to the above-described embodiment and can be modified into various forms that can be conceived by a person skilled in the art within the scope of the invention described in the claims.

For example, in the embodiment described above, a case has been exemplified and described in which the terrace section 101 has a thickness (y axis direction) thinner than the thickness of the region where the Si waveguide 110 is formed in the waveguide substrate 100. However, the terrace section 101 may be formed to have a thickness equal to or thicker than the thickness of the region where the Si waveguide 110 is formed.

Further, a case has been exemplified and described in which the thickness of the terrace section 101 is constant from the outgoing end surface side of the Si waveguide 110 toward the end surface of the optical fiber 130. However, the thickness of the terrace section 101 is not limited to a constant thickness. For example, the thickness of the terrace section 101 may be formed to be gradually thinned from the outgoing end surface side of the Si waveguide 110 toward the end surface of the optical fiber 130.

Although, in the embodiments described above, a case has been described in which the core 111 of the Si waveguide 110 and the waveguide substrate 100 are formed of a Si material, the material thereof is not limited to Si, and the above constituent elements may be formed of any of, for example, compound semiconductors or the like, that is, other semiconductor materials, inorganic materials, and organic materials.

REFERENCE SIGNS LIST

1 Optical connection structure
100 Waveguide substrate
101 Terrace section
102 Surface
103 End surface
110 Si waveguide
111 Core
112 Lower clad
113 Upper clad
120 Block
130 Optical fiber 131 Core
132 Clad
140 Connection layer
141 Lens
141a Supporter
142 Filler
150 Adhesive layer
p1, p1' Principal point
l1 Object distance
l2 Image distance
l3 Lens height.

The invention claimed is:

1. An optical connection structure comprising:
a substrate;
a first waveguide on a first surface of the substrate, the first waveguide including a first end surface;
a second waveguide comprising a second end surface facing the first end surface of the first waveguide;
a terrace extending toward the second waveguide from a third end surface of the substrate, the third end surface of the substrate facing the second waveguide;
an optical element on the terrace, wherein the optical element is arranged on an optical axis connecting the first end surface of the first waveguide and the second end surface of the second waveguide; and
an adhesive layer bonding a fourth end surface of the terrace to the second end surface of the second waveguide.

2. The optical connection structure according to claim 1, further comprising:
a connection layer formed of a material having a refractive index smaller than a refractive index of the optical element, and wherein the connection layer is configured to cover the optical element between the first end surface and the second end surface.

3. The optical connection structure according to claim 2, wherein a length along the optical axis of the terrace corresponds to an optical path length of an optical system including the optical element in the connection layer.

4. The optical connection structure according to claim 1, wherein a surface of the terrace is lower than the first surface of the substrate on which the first waveguide is formed.

5. The optical connection structure according to claim 1, wherein the optical element includes a light curing resin material.

6. The optical connection structure according to claim 1, wherein the optical element is a lens configured to focus light.

7. The optical connection structure according to claim 1, further comprising:
a second optical element on the terrace, wherein the second optical element is arranged on the optical axis connecting the first end surface of the first waveguide and the second end surface of the second waveguide.

8. A method comprising:
providing a substrate;
forming a first waveguide on a first surface of the substrate, the first waveguide including a first end surface;
arranging a second end surface of a second waveguide to face the first end surface of the first waveguide, wherein a terrace extends toward the second waveguide from a third end surface of the substrate, the third end surface of the substrate facing the second waveguide;
bonding, with an adhesive layer, a fourth end surface of the terrace to the second end surface of the second waveguide; and
attaching an optical element on the terrace, wherein the optical element is arranged on an optical axis connecting the first end surface of the first waveguide and the second end surface of the second waveguide.

9. The method according to claim 8, further comprising:
forming a connection layer of a material having a refractive index smaller than a refractive index of the optical element, wherein the connection layer covers the optical element between the first end surface and the second end surface.

10. The method according to claim 9, wherein a length along the optical axis of the terrace corresponds to an optical path length of an optical system including the optical element in the connection layer.

11. The method according to claim 8, wherein a surface of the terrace is lower than the first surface of the substrate on which the first waveguide is formed.

12. The method according to claim 8, wherein the optical element includes a light curing resin material.

13. The method according to claim 8, wherein the optical element is a lens configured to focus light.

14. The method according to claim 8, further comprising:
attaching a second optical element on the terrace, wherein the second optical element is arranged on the optical axis connecting the first end surface of the first waveguide and the second end surface of the second waveguide.

15. The method according to claim 14, wherein the second optical element is physically separated from the optical element.

16. The method according to claim 8, wherein a core of the second waveguide is thicker than a core of the first waveguide.

17. The optical connection structure according to claim 7, wherein the second optical element is physically separated from the optical element.

18. The optical connection structure according to claim 1, wherein a core of the second waveguide is thicker than a core of the first waveguide.

* * * * *